US 9,308,803 B2

(12) United States Patent
Nabuurs et al.

(10) Patent No.: US 9,308,803 B2
(45) Date of Patent: Apr. 12, 2016

(54) OPEN ROOF CONSTRUCTION FOR A VEHICLE, AND PANEL FOR USE THEREIN

(71) Applicant: Inalfa Roof Systems Group B.V., Venray (NL)

(72) Inventors: Martinus Wilhelmus Maria Nabuurs, Overloon (NL); Robert Rikkert, Nuenen (NL); Sander De Bie, Nuth (NL)

(73) Assignee: Inalfa Roof Systems Group B.V., Venray (NL)

( * ) Notice: Subject to any disclaimer, the term of this patent is extended or adjusted under 35 U.S.C. 154(b) by 0 days.

(21) Appl. No.: 14/288,639

(22) Filed: May 28, 2014

(65) Prior Publication Data
US 2014/0354017 A1 Dec. 4, 2014

(30) Foreign Application Priority Data

May 30, 2013 (EP) .................................. 13169849

(51) Int. Cl.
*B60J 7/04* (2006.01)
*B60J 7/00* (2006.01)

(52) U.S. Cl.
CPC .. *B60J 7/04* (2013.01); *B60J 7/0007* (2013.01)

(58) Field of Classification Search
CPC ............... B60J 1/001; B60J 1/002; B60J 7/04
USPC ..................... 296/211, 216.01–224
See application file for complete search history.

(56) References Cited

U.S. PATENT DOCUMENTS

| 2,795,018 | A | * | 6/1957 | Shaw ................................ 65/36 |
| 3,629,980 | A | * | 12/1971 | Hordis ............................... 52/1 |
| 3,771,276 | A | * | 11/1973 | Stewart et al. ................. 52/172 |
| 4,065,894 | A | * | 1/1978 | Day ............................. 52/171.3 |
| 4,394,806 | A | * | 7/1983 | Day ............................. 52/172 |
| 4,542,611 | A | * | 9/1985 | Day ............................. 52/172 |
| 4,567,703 | A | * | 2/1986 | Ricks ......................... 52/204.52 |
| 4,604,840 | A | * | 8/1986 | Mondon ......................... 52/172 |
| 4,835,926 | A | * | 6/1989 | King ............................. 52/171.3 |
| 4,942,704 | A | * | 7/1990 | King ............................. 52/171.3 |
| 4,979,342 | A | * | 12/1990 | Holdridge et al. .......... 52/171.1 |
| 6,553,728 | B1 | * | 4/2003 | Zurn ............................. 52/171.3 |

(Continued)

FOREIGN PATENT DOCUMENTS

| CH | 442411 | 8/1967 |
| DE | 19943243 | 4/2001 |

(Continued)

OTHER PUBLICATIONS

European Search Report for corresponding foreign application EP 13169849.0, filed May 30, 2013.

*Primary Examiner* — Dennis H Pedder
(74) *Attorney, Agent, or Firm* — Steven M. Koehler; Westman, Champlin & Koehler, P.A.

(57) ABSTRACT

An open roof construction for a vehicle having an opening in its fixed roof comprises a stationary part and at least a panel supported by the stationary part and configured to close the opening in the fixed roof. The panel include two substantially parallel sheets connected and sealed to each other at least along their circumference in order to create a space there between containing gas. The space communicates with a pressure equalizing device equalizing the pressure in the space with the ambient pressure. The pressure equalizing device can be an open or closed system.

26 Claims, 9 Drawing Sheets

(56) References Cited

U.S. PATENT DOCUMENTS

| | | | | |
|---|---|---|---|---|
| 6,800,114 | B2* | 10/2004 | Vanderhoof et al. | 95/117 |
| 7,293,391 | B2* | 11/2007 | Guhl et al. | 52/204.593 |
| 8,782,971 | B2* | 7/2014 | Milburn et al. | 52/172 |
| 8,875,456 | B2* | 11/2014 | Waddell | 52/209 |
| 8,925,286 | B2* | 1/2015 | Hagen et al. | 52/786.1 |
| 2008/0000195 | A1* | 1/2008 | Clarahan | 52/786.13 |
| 2010/0096889 | A1* | 4/2010 | Horiuchi et al. | 296/216.01 |

FOREIGN PATENT DOCUMENTS

| | | |
|---|---|---|
| DE | 10347559 | 5/2005 |
| WO | 2012177995 | 12/2012 |

\* cited by examiner

OPEN ROOF CONSTRUCTION FOR A VEHICLE, AND PANEL FOR USE THEREIN

BACKGROUND

The discussion below is merely provided for general background information and is not intended to be used as an aid in determining the scope of the claimed subject matter.

Aspects of the invention relate to an open roof construction for a vehicle having an opening in its fixed roof, comprising a stationary part and at least a panel supported by the stationary part and configured to close the opening in the fixed roof, said panel including two substantially parallel sheets connected and sealed to each other at least along their circumference in order to create a space therebetween containing gas.

The space between the panel sheets can be used for example for integrating a shading device into the panel, e.g. electronic or mechanical shading device. Due to different circumstances under which the vehicle should operate, e.g. different weather conditions or altitudes, different speeds and the like, the relative pressure between the space and the surrounding can change considerably. Due to these pressure differences, the panel sheet(s) can deform thereby jeopardizing the correct operation of the shading device.

SUMMARY

This Summary and the Abstract herein are provided to introduce a selection of concepts in a simplified form that are further described below in the Detailed Description. This Summary and the Abstract are not intended to identify key features or essential features of the claimed subject matter, nor are they intended to be used as an aid in determining the scope of the claimed subject matter. The claimed subject matter is not limited to implementations that solve any or all disadvantages noted in the Background.

An aspect of the invention is to provide a solution for, or at least reduce, this problem.

According to an aspect of the invention, said space communicates with a device equalizing the pressure in the space with the ambient pressure.

Due to this equalizing or balancing device, the pressure difference can be reduced or eliminated, thereby also reducing or eliminating the deformation of the panel sheet(s).

In one embodiment, the device comprises a controlling vessel regulating the pressure in the space and closing off said space from the environment.

Because the pressure equalizing device closes off said space, this space is protected from dirt and moisture.

The closed volume in the controlling vessel that is communicating with the space in the panel may be variable, for example when the controlling vessel includes two vessel spaces separated by a movable wall, one vessel space communicating with the space between the sheets, the other vessel space communicating with the ambient air. This is a simple pressure equalizing device and way of equalizing the pressure.

In one embodiment, the movable wall is a deformable membrane. This obviates the need for a sliding seal as there are no surfaces moving relatively.

The controlling vessel may be provided in or on the stationary part. In that case, the controlling vessel may for example communicate with the space between the sheets of the panel through a flexible hose. This is for example useful if the (local) movements between the panel and the vessel are relatively small.

In another embodiment, especially if the panel is a movable panel configured to move between a closed position closing the roof opening and an open position releasing the roof opening at least partly, and if it comprises a drain channel arranged near an edge of the roof opening, the controlling vessel may communicate with the space between the sheets of the panel through a pressure equalizing device comprising a coupling having a valve opening and closing respectively when the panel is coupled or uncoupled from the controlling vessel.

In this embodiment, the movements of the panel are unlimited. Although the pressure equalizing device is then not active all the time, it is able to balance the pressure once the panel is closed. If there is a shading device between the panel sheets, it will normally only be used if the panel is in the closed position.

The controlling vessel may be arranged at the rear edge of the roof opening, especially if the panel is movable at least between the closed position and a venting position in which a rear edge of the panel is raised.

In another embodiment, the panel is provided with a reinforcement and the pressure equalizing device is combined with or even be integrated in the reinforcement, preferably on the front and/or rear side of the panel.

In such embodiment, there is no need for a connection between the panel and the pressure equalizing device at the stationary part, as the pressure equalizing device will follow the panel with every movement.

The controlling vessel may be elongated and may extend in transverse direction, as this will facilitate integration in the reinforcement of the panel.

The membrane in the controlling vessel may extend substantially parallel to the elongated direction of the controlling vessel, such that the vessel is divided in a top and bottom, or front and rear vessel spaces, or the membrane in the controlling vessel extends substantially perpendicularly to the elongated direction of the controlling vessel, so that the vessel is divided in left and right vessel spaces, or the membrane in the controlling vessel is an inflatable and deflatable balloon attached to a an outlet of the space between the panel sheets.

According to another aspect of the invention, the pressure equalizing device comprises a dryer unit communicating with the environment, wherein the dryer unit may contain dehydrating material and optionally a filter.

This is an open system, wherein there is a direct communication between the space within the panel and the environment, although only through the dryer unit which keeps the space within the panel dry and clean.

The dehydrating material may be replaceable or dehydratable, in order to be maintained so as to able to function through a long lifetime of the panel.

Aspects of the invention also include a panel assembly for use in an open roof construction as described above.

BRIEF DESCRIPTION OF THE DRAWINGS

Further details and advantages of the open roof construction follow from the description below with reference to the attached drawings showing embodiments of the open roof construction by way of example.

DETAILED DESCRIPTION OF THE ILLUSTRATIVE EMBODIMENTS

Figure 1:
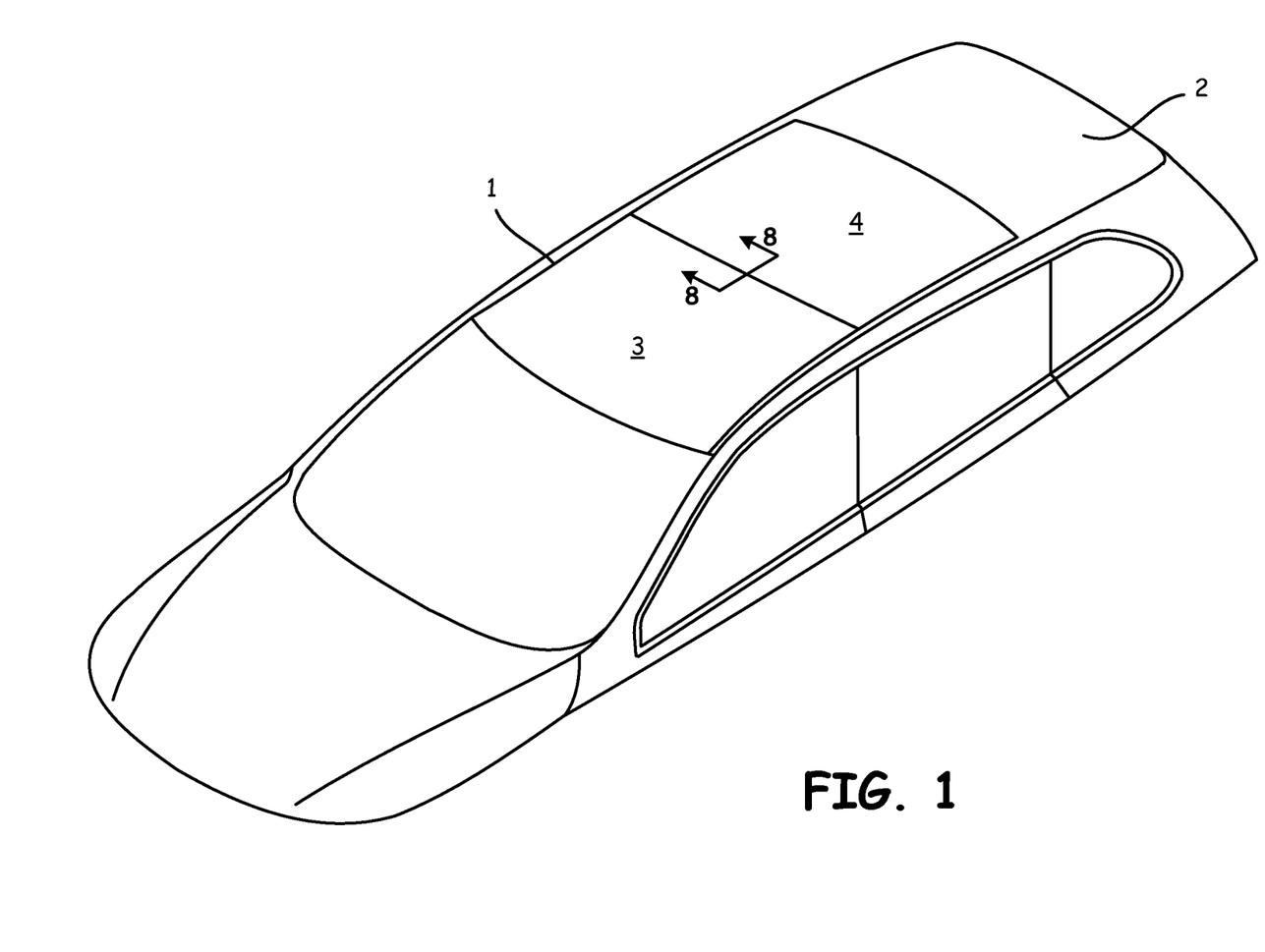
FIG. 1 is a schematic perspective view of the upper part of a vehicle comprising an embodiment of the open roof construction.

Referring to FIG. 1, a vehicle having an open roof construction in its fixed roof 2 is illustrated schematically. Said open roof construction comprises a roof opening 1 in the fixed roof 2 of the vehicle, such as a passenger car, and at least first and second closure panels 3, 4 for example glass or plastic, commonly at least partly transparent panels as shown in FIG. 1. The first and second closure panels 3, 4 can be moved for closing and at least partially opening said roof opening 1 by mechanisms that are known in the art and not described further here.

Figure 2:
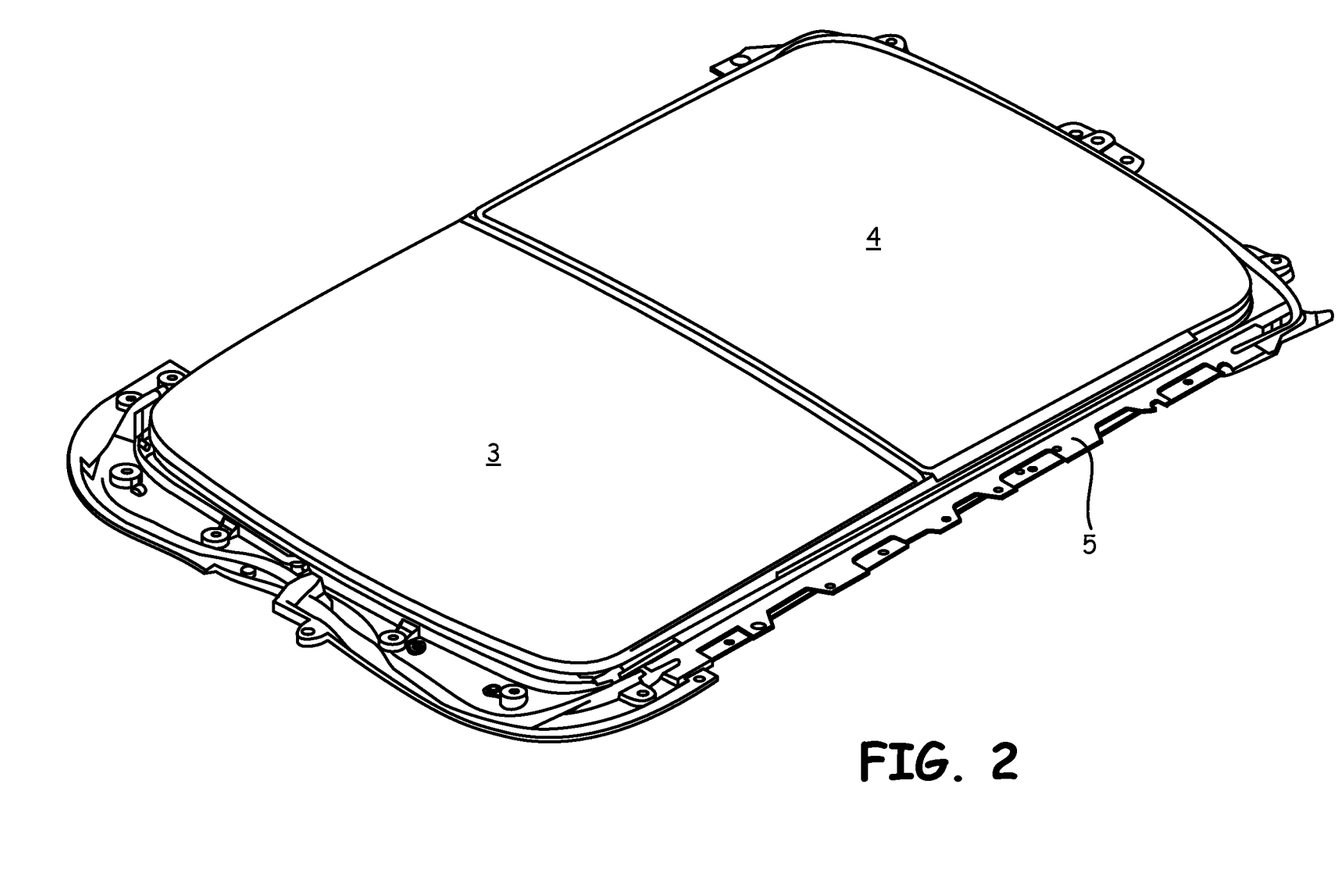
FIG. 2 is an enlarged perspective view of the open roof construction of FIG. 1.
Figure 3:
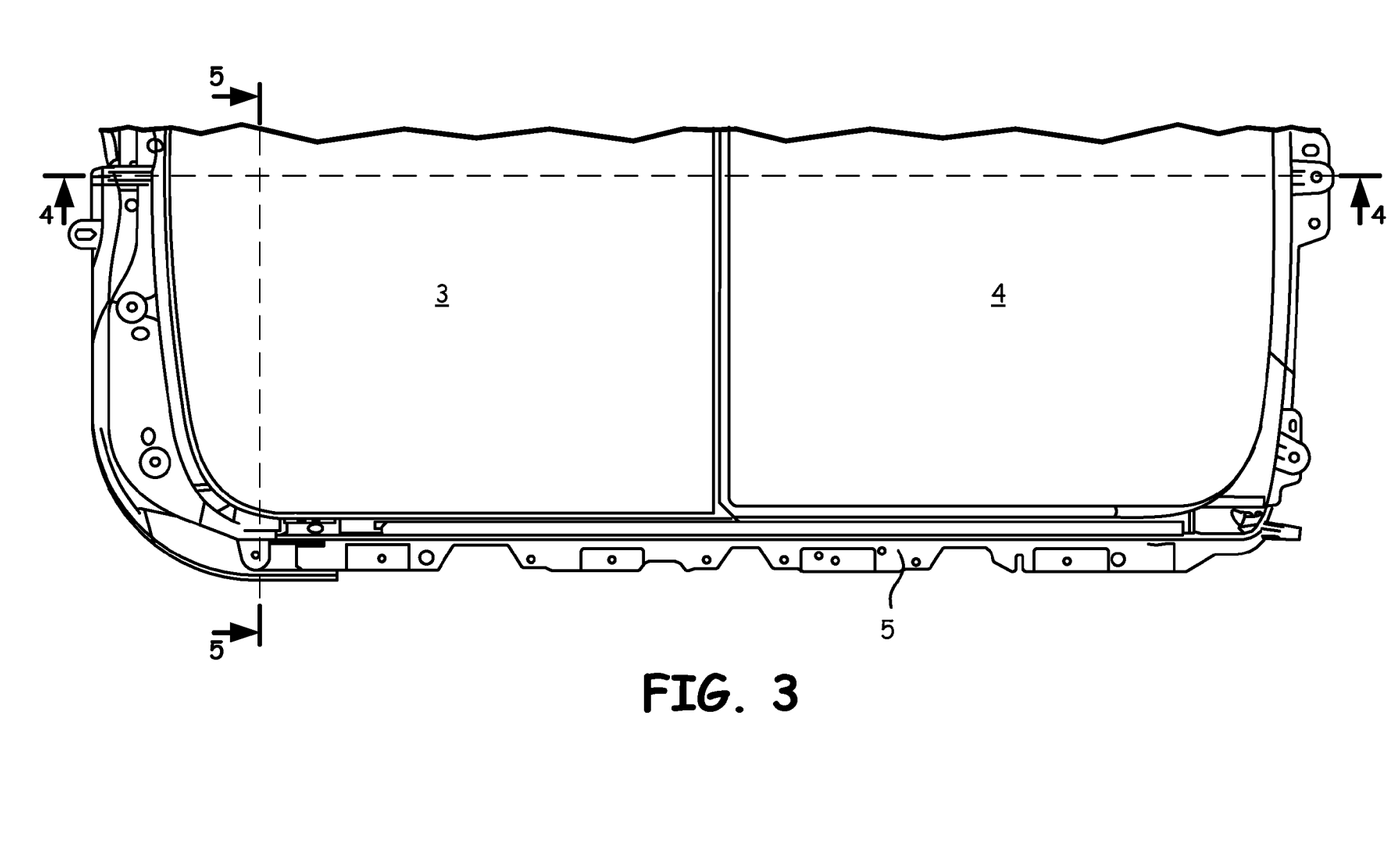
FIG. 3 is a plan view of the left part of the open roof construction of FIG. 2.

Referring to FIGS. 2 and 3, an open roof system or panel assembly is schematically illustrated, comprising the first and second movable panels 3, 4, connected via a moving mechanism (not shown here), which is known per se, to a stationary part 5, particularly a frame, and further comprising a motor and guiding channels (not shown but again are well known). The stationary part 3 comprises front and rear members and a center member, which are known per se, and not further elucidated and are connected to lateral extrusion guides, and said stationary part 5 connects the open roof system with the body of the vehicle by means of well known methods and mechanisms the usual fixing concepts.

Figure 4:
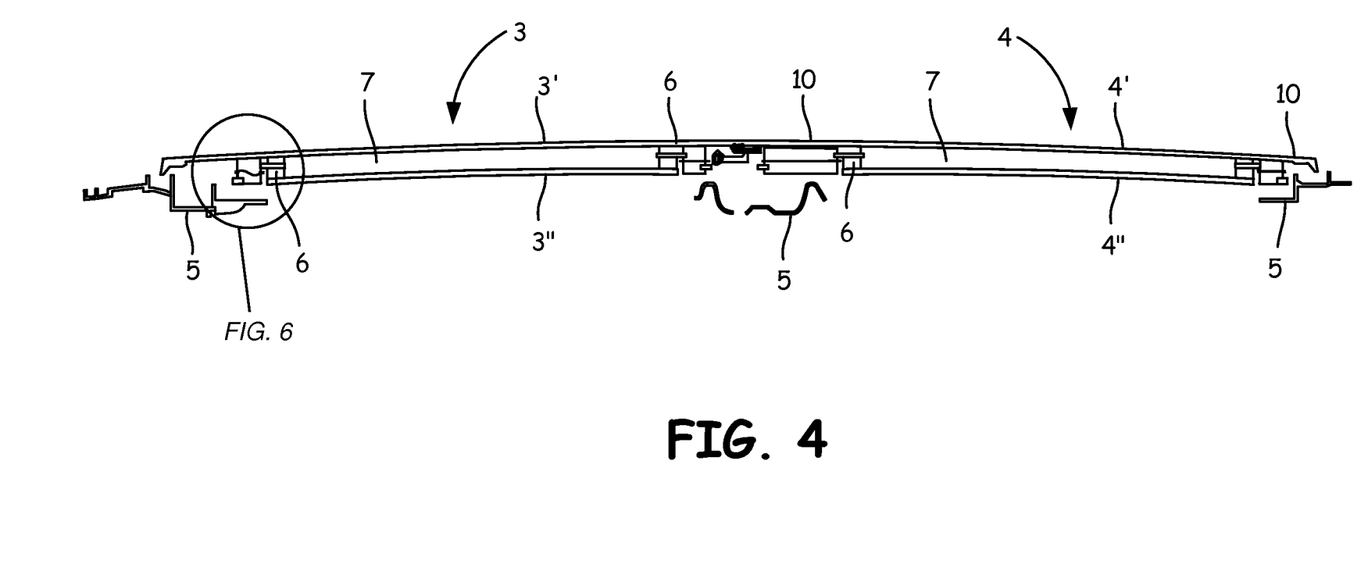
FIG. 4 is a very schematic sectional view of the open roof construction according to the line IV-IV in FIG. 3.

FIG. 4 schematically shows a section of the roof 2. It can be recognized that each panel 3, 4 is made up of an upper and lower panel sheet 3', 3" and 4', 4", respectively. These panel sheets 3', 3" and 4', 4" are connected and sealed to each other along their circumference by a circumferential spacer 6 to form a space 7 within this circumferential spacer 6 and between the panel sheets 3', 3" and 4', 4". In this embodiment, the upper panel sheet 3', 4' is larger than the respective lower panel sheet 3", 4", so that the corresponding spacer 6 is closer to the circumference of the lower panel sheet 3", 4" than to the circumference of the upper panel sheet 3', 4'. The dimensions of the upper panel sheets 3', 4' together substantially correspond to that of the roof opening 1 in the fixed roof 2, the dimensions of the lower panel sheet 3", 4" substantially correspond to openings 8, 9 in the stationary part 5 of the open roof construction. Other relative dimensions are conceivable. The space 7 within each panel 3'4' may comprise a shading device, either electronic or mechanical such as but not limited to a roller shade.

Figure 5:
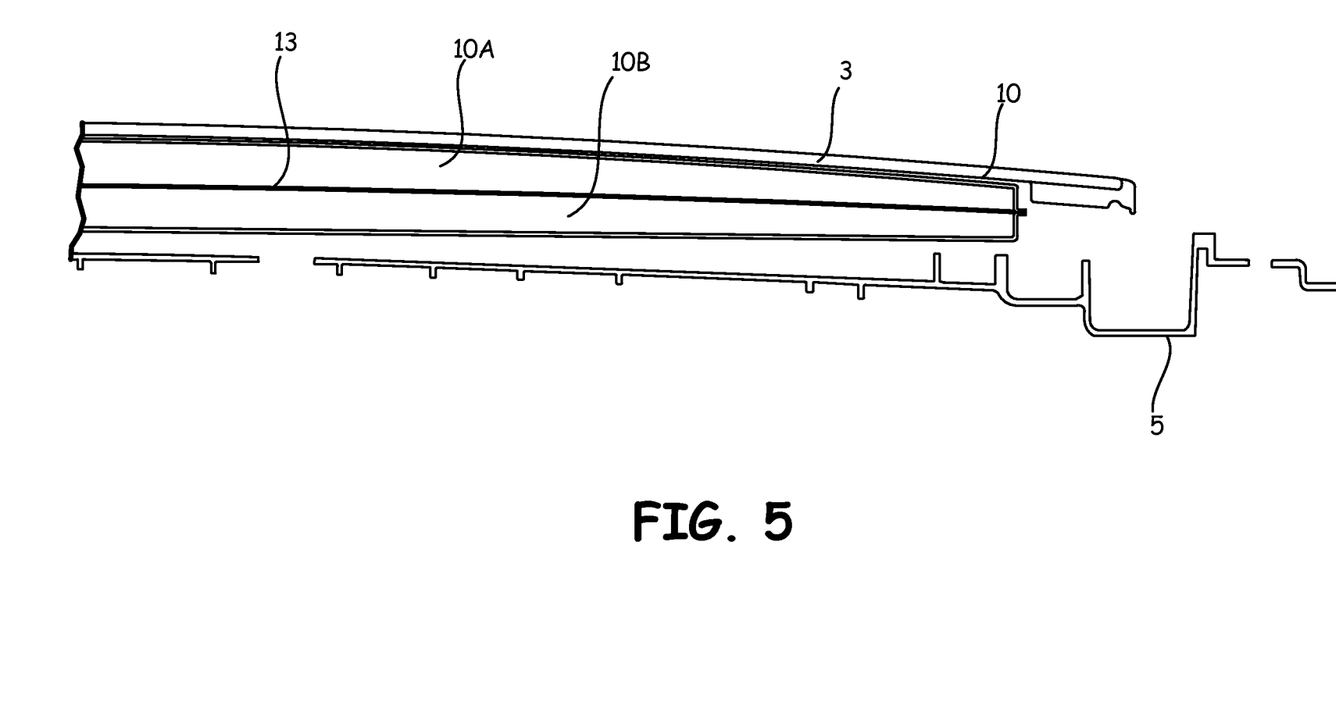
FIG. 5 is an enlarged sectional view of the open roof construction according to the line V-V in FIG. 3.
Figure 6:
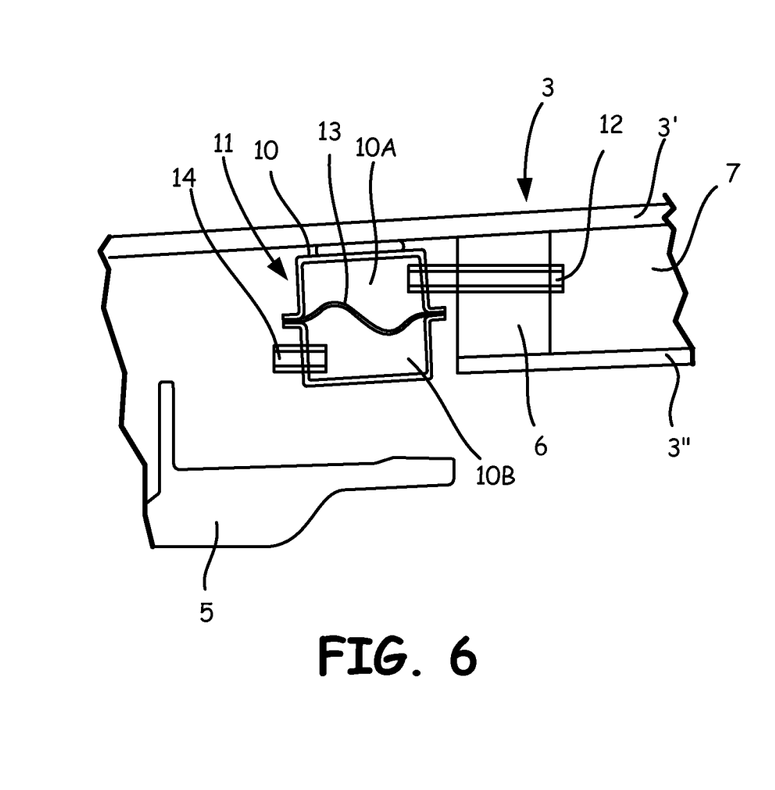
FIG. 6 shows detail in FIG. 4 on a larger scale.

FIGS. 4, 5 and 6 show a first embodiment of a device for balancing/equalizing the pressure between the space 7 and the environment. This pressure equalizing device includes a vessel 10, which in this case is integrated in each panel 3, 4, in particular in a reinforcement 11 thereof which is already present in the panel 3, 4. This reinforcement 11 is generally arranged around the circumference of the panel 3, 4, but especially on the front and rear side thereof. The panels 3'4' can have a plurality of connected or spaced apart reinforcement members 11 about the circumference. The reinforcement member(s) 11 is mounted below the upper surface of the panel 3, 4 and in particular below the upper panel sheets 3', 4'. The vessel 10 can be present at the front or rear of the panel 3, 4 but also at the front and rear, as is illustrated in the drawings. The vessel(s) 10 is elongated and extends in transverse direction. It is fixed to the corresponding panel outwardly 3,4 of the spacer 6 below the upper panel sheet 3', 4'. It is spaced a short distance from the spacer 6, but it could also be integrated with it such as being formed as a single unitary body. One or more conduits 12 provide communication between the space 7 and the vessel 10 and extend through the spacer 6 in a sealed manner. If the vessel 10 and the spacer 6 are integrated as a single unitary body, just one or more holes would suffice.

The vessel 10 is divided in two vessel spaces 10A and 10B separated from each other by a movable wall, in this case by a deformable membrane 13. The vessel space 10A is communicating with the space 7 in the panel 3, 4, the vessel space 10B is communicating with the environment through a conduit 14, or at least an aperture. The membrane 13 is gas-tight and can move under influence of pressure differences between the space 7 and the environment. The space 7 within the panels 3, 4 is completely closed-off from the environment, and thus this system is a closed system. It contains a gas suitable for its purpose, or just dry and clean air. If the pressure outside the panel 3, 4 is decreasing relatively (for example if the vehicle travels to a higher altitude), the volume of the gas inside the panel 3, 4 has a tendency to expand because the pressure therein remains constant. This expansion is made possible by the membrane 13 which moves to increase vessel space 10A and thus to increase the total volume of space 7 and vessel space 10A, such that the pressure in space 7 becomes equalized with the environmental pressure. Thus, there is no pressure on the panel sheets 3',3",4',4" due to pressure differences. The opposite happens if environmental pressure increases.

Figure 7:
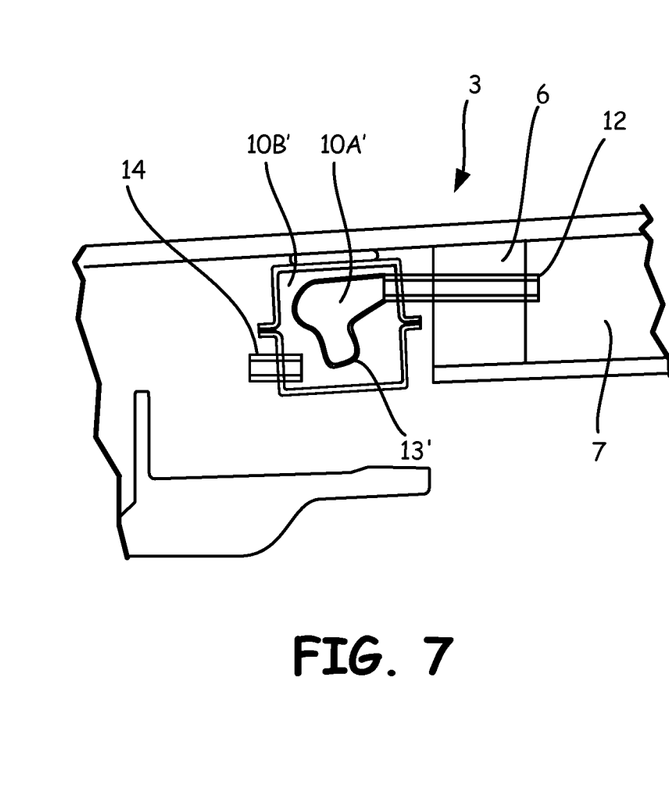
FIG. 7 is a view corresponding to that of FIG. 6 but showing a variation of the embodiment.

FIG. 7 shows a variation of the embodiment of FIG. 6 in that the membrane 13' does not divide the vessel 10 in an upper vessel space 10A and a lower vessel space 10B (due to the membrane edges being clamped between upper and lower vessel halves or otherwise secured to the inner surfaces of the vessel 10), but in an inner vessel space 10A' and an outer vessel space 10B'. In this embodiment, the membrane 13' is like a balloon or bag which can be inflated and deflated. The inner vessel space 10A' communicates with the panel space 7 with conduit 12 or other suitable aperture(s). The function of the membrane 13' and vessel spaces 10A', 10B' is similar to that of the former embodiments. The movement of the membrane 13' or other movable wall should be sufficient to enable a volume change within the combined panel space 11 and vessel space 10A' to allow the pressure in these spaces to follow the environmental pressure.

Figure 8:
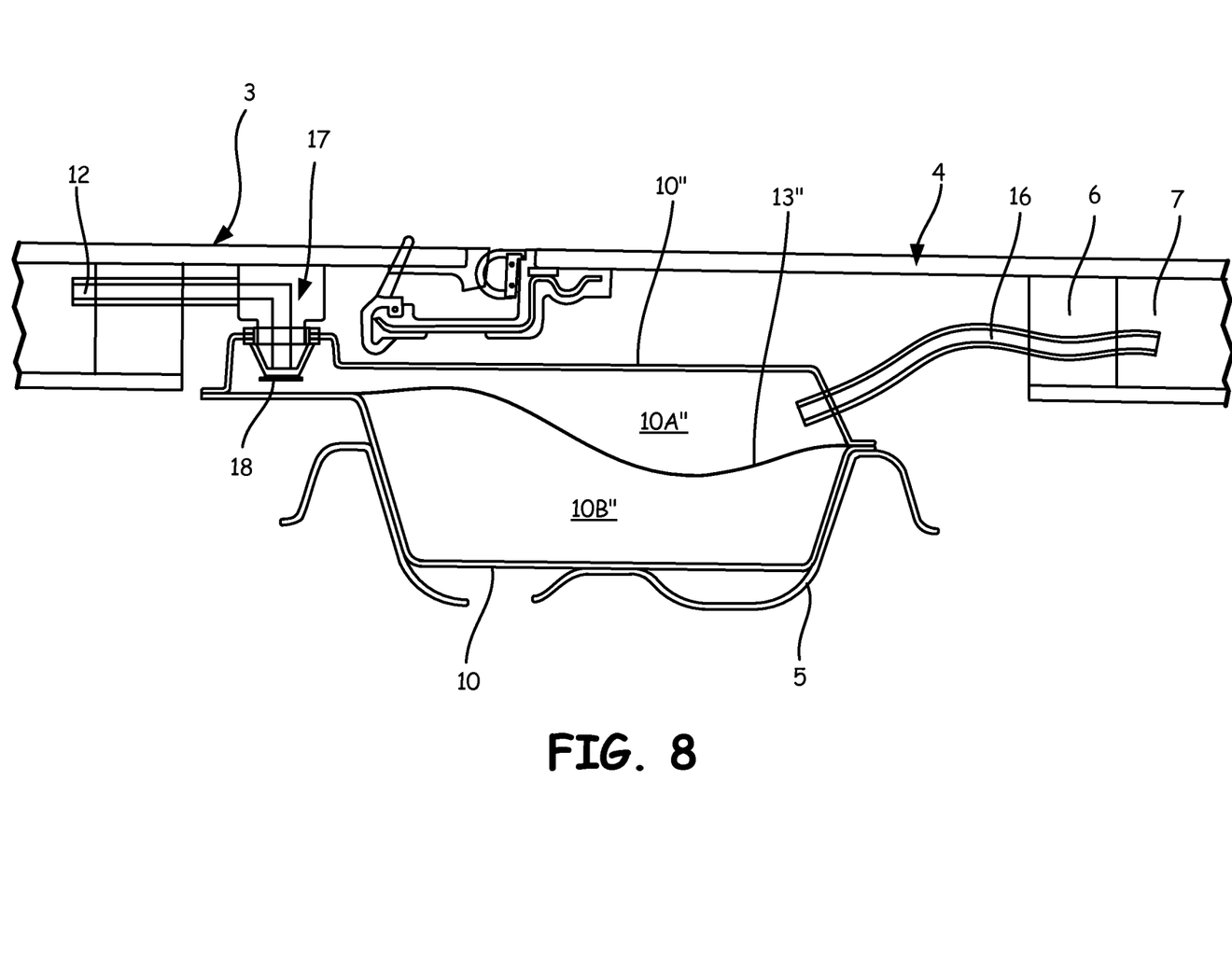
FIG. 8 is an enlarged sectional view according to the line VIII-VIII in FIG. 1 but showing an alternative embodiment of the pressure equalizing device.
Figure 9:
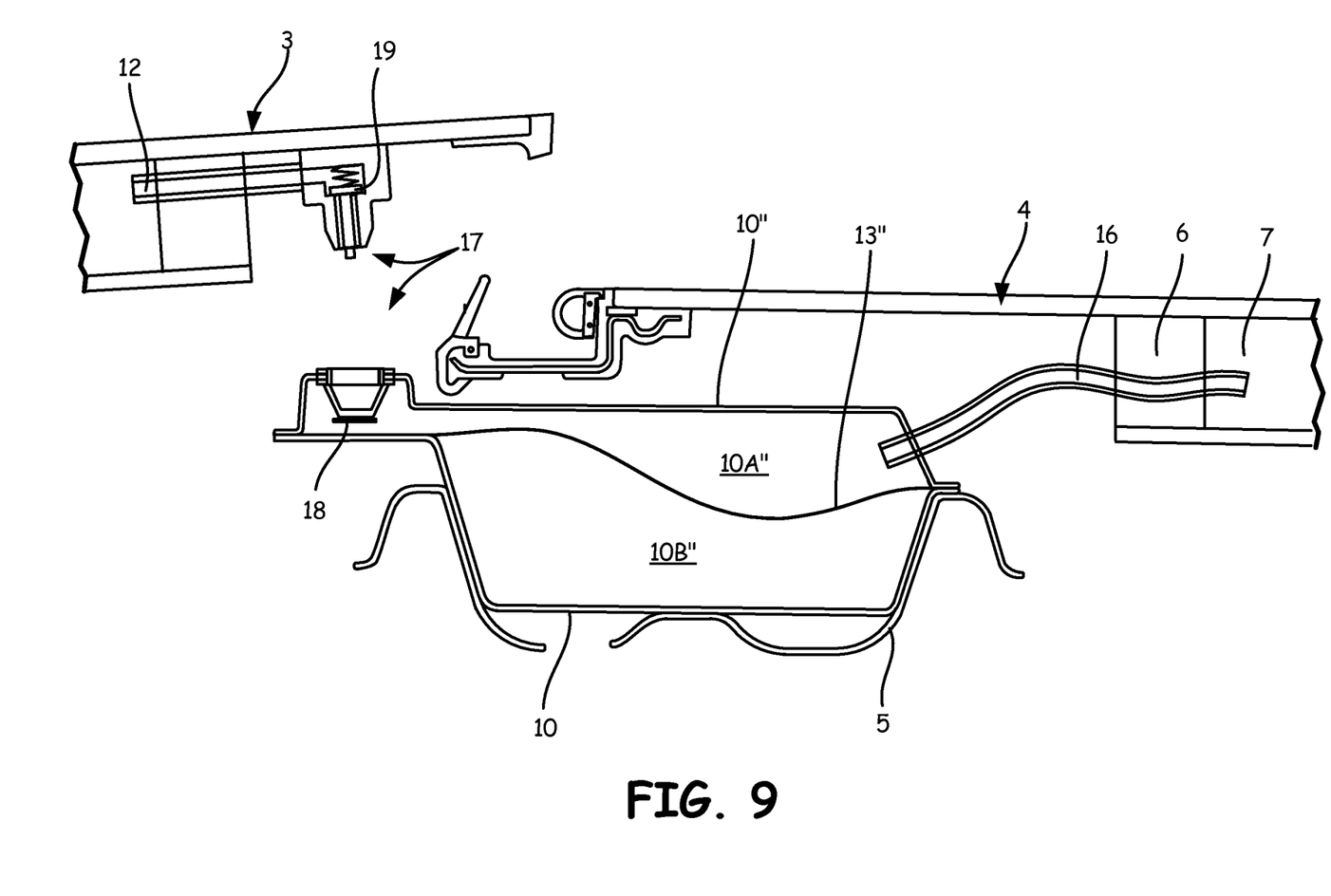
FIG. 9 is a view corresponding to that of FIG. 8, but showing the front panel in venting position.

FIGS. 8 and 9 shows an embodiment of the device in which a vessel 10" is connected to the stationary part 3, in this case at a position between the rear edge of the front panel 3 and the front edge of the rear panel 4. It is accommodated in a transverse beam between the openings 8 and 9 in the stationary part 3. In the embodiment of the open roof construction as shown, the rear panel 4 is configured to move between a closed position within the roof opening 1 and a venting position in which its rear edge is raised. The front panel 3 can also move between closed and venting positions, but may also move from the venting position rearwardly, or make other movements.

The front and rear panels 3, 4 use one common vessel 10" which is now of a larger volume. The communication between the space 7 in the rear panel 4 and the vessel space 10A" is provided by a conduit which can be constructed as a flexible tube 16 allowing limited movements of the rear panel 4 with respect to the vessel 10". The communication between the vessel 10" and the space 7 in the front panel 3 is provided by a valve assembly 17 including a valve 18 in the vessel 10" and a valve 19 at the end of the conduit 12 or other suitable aperture(s). Both valves 18, 19 close if the panel 3 moves away from the vessel 10, and both valves 18, 19 are opened if the panel valve 19 engages the vessel valve 18. In this manner no environmental air can enter the vessel and panel spaces 7, 10A", so that it remains a closed system. Balancing of pressures can only take place with the panel 3 in its closed position, but this hardly affects the effectiveness of the device pressure equalizing. It might be automated to move the panel 3 to the closed position if the pressure difference between space 7 and the environment rises above a certain level.

Figure 10:
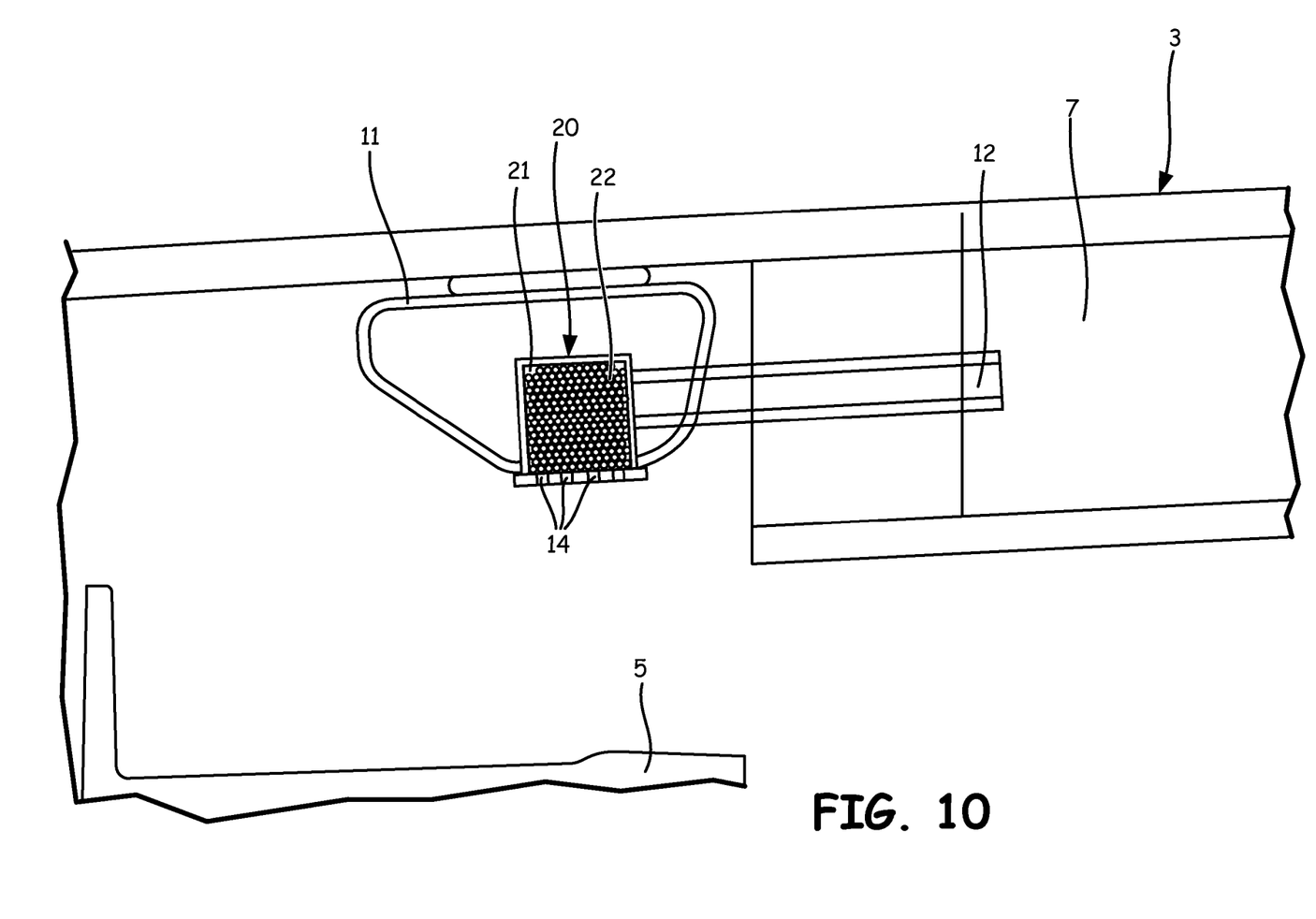
FIG. 10 is an enlarged sectional view corresponding to that of FIG. 6, but showing an alternative embodiment of the pressure equalizing device.

FIG. 10 shows a further embodiment of the pressure equalizing device which is now an open system, in which there is direct communication between the space 7 in the panels 3, 4 and the environment. However, the communication is only possible through a dryer unit 20. This ensures that if environmental air is sucked in into the space 7 as a result of the pressure difference between space 7 and environment, it is dried and optionally also cleaned before it enters the space 7, so that it stays dry and clean. In the embodiment shown, the dryer unit 20 comprises a container 21 containing dehydrating material 22, such as hydrogel, silica gel calcium chloride or the like, and possibly also a filter to keep out dust particles and other pollutions. The container 21 is combined with the panel reinforcement 11 of each panel 3, 4 such that the reinforcing strength thereof is not reduced. The container 21 is communicating with the space 7 within the panels 3, 4, respectively through one or more conduits 12 or apertures(s) on the one hand and with the environment through one or more conduits 14 or apertures(s) on the other hand. Communication between the conduits 12, 13 is only possible through the dehydrating material 22. Generally, the conduit 14 communicates with the interior of the vehicle, but could also communicate with the exterior of the vehicle. The dehydrating material 22 should be reachable in order to be serviced, either by its replacement or by being dehydrated.

The invention is not limited to the embodiments shown in the drawings and described above, and can be varied in different manners within the scope of the invention. For example, the invention is also useful in fixed roof panels. The membrane could be replaced by another displaceable or deformable wall adapted to change the volume of the space with the panel. The vessel may be connected to or integrated in the panel in another way or in other positions. In the closed system with the equalizing vessel, a part of the vessel is generally in open communication with the environment. To keep this part of the vessel dry and clean, the drying unit such as described above may be combined with the vessel.

Although the subject matter has been described in language specific to structural features and/or methodological acts, it is to be understood that the subject matter defined in the appended claims is not necessarily limited to the specific features or acts described above as has been held by the courts. Rather, the specific features and acts described above are disclosed as example forms of implementing the claims.

What is claimed is:

1. An open roof construction for a vehicle having an opening in its fixed roof, comprising
   a stationary part;
   at least a panel supported by the stationary part and configured to close the opening in the fixed roof, said panel including two substantially parallel sheets connected and sealed to each other at least along their circumference in order to create a space there between containing gas; and
   a pressure equalizing device connected to fluidly communicate with the space to equalize the pressure in the space with the ambient pressure, wherein the pressure equalizing device comprises a controlling vessel configured to regulate the pressure in the space and closing off said space from the environment;
   wherein the panel is a movable panel configured to move between a closed position closing the roof opening and an open position releasing the roof opening at least partly, and wherein the controlling vessel includes a coupling to communicate with the space between the sheets of the panel, the coupling having a valve configured to open and close respectively when the panel is closed and coupled to or open and uncoupled from the controlling vessel.

2. The open roof construction according to claim 1, wherein the controlling vessel comprises a variable closed volume communicating with the space in the panel.

3. The open roof construction according to claim 2, wherein the controlling vessel includes first and second vessel spaces separated by a movable wall, the first vessel space communicating with the space between the sheets, the second vessel space communicating with the ambient air.

4. The open roof construction according to claim 3, wherein the movable wall is a deformable membrane.

5. The open roof construction according to claim 1, wherein the controlling vessel is disposed in or on the stationary part.

6. The open roof construction according to claim 5, wherein the controlling vessel communicating with the space between the sheets of the panel includes a flexible hose.

7. The open roof construction according to claim 1, wherein the controlling vessel is arranged at the rear edge of the roof opening.

8. The open roof construction according to claim 1, wherein the valve assembly comprises valves, one cooperating with the controlling vessel and one with the space in the panel, the valves configured to close the controlling vessel and space in the panel, respectively, when disconnected and connecting the controlling vessel and space in the panel when connected.

9. The open roof construction according to claim 1, wherein the panel includes a reinforcement and the pressure equalizing device being combined with the reinforcement.

10. The open roof construction according to claim 1, wherein the controlling vessel is elongated and extends in a transverse direction with respect to forward movement of the vehicle.

11. The open roof construction according to claim 4, wherein the membrane in the controlling vessel extends substantially parallel to an elongated direction of the controlling vessel, such that the vessel is divided in top and bottom vessel spaces, or the membrane in the controlling vessel is an inflatable and deflatable balloon attached to an outlet of the space between the panel sheets.

12. The open roof construction according to claim 5, wherein the panel comprises a front and rear panel positioned one behind the other, wherein the pressure equalizing device is arranged at a position near a rear edge of the front panel and a front edge of the rear panel.

13. The open roof construction according to claim 12, wherein the space in the panel comprises a front panel space in the front panel and a rear panel space in the rear panel, the front panel being movable and the front panel space in the front panel being connected to the controlling vessel through a valve assembly when the front panel is in its closed position, the rear panel space in the rear panel communicating with the controlling vessel through a flexible tube.

14. The open roof construction according to claim 7, wherein the panel is movable at least between the closed position and a venting position in which a rear edge of the panel is raised.

15. The open roof construction according to claim 9, wherein the reinforcement member is on the front and/or rear side of the panel.

16. The open roof construction according to claim 4 wherein the membrane in the controlling vessel is an inflatable and deflatable balloon attached to an outlet of the space between the panel sheets.

17. An open roof construction for a vehicle having an opening in its fixed roof, comprising
    a stationary part;
    at least a panel supported by the stationary part and configured to close the opening in the fixed roof, said panel comprising:
        substantially parallel upper and lower sheets, the upper sheet having a portion extending beyond a segment of a circumference of the lower sheet such that the upper sheet is larger than the lower sheet;
        a spacer joined to an under side of the upper sheet and an upper side of the lower sheet along the circumference of the lower sheet in order to create a space there between containing gas; and
        an elongated reinforcement directly joined to an under side of the portion of the upper sheet apart from the spacer and extending only downwardly from the underside of the upper sheet, the reinforcement comprising a pressure equalizing device in fluid communication with the space and configured to equalize pressure in the space with ambient air, said pressure equalizing device including at least a controlling vessel communicating with the space through one or more conduits, said controlling vessel of said pressure equalizing device being integrated in said reinforcement.

18. The panel according to claim 17, wherein the pressure equalizing device is provided on at least one of the front and rear sides of the panel.

19. The panel according to claim 17, wherein the pressure equalizing device is provided mainly within the reinforcement.

20. The open roof construction according to claim 17, wherein the controlling vessel comprises a variable closed volume communicating with the space in the panel.

21. The open roof construction according to claim 20, wherein the controlling vessel includes first and second vessel spaces separated by a movable wall, the first vessel space communicating with the space between the sheets, the second vessel space communicating with the ambient air.

22. The open roof construction according to claim 21, wherein the movable wall is a deformable membrane.

23. The open roof construction according to claim 2, wherein the membrane in the controlling vessel extends substantially parallel to an elongated direction of the controlling vessel, such that the vessel is divided in top and bottom vessel spaces.

24. The panel according to claim 2 wherein the membrane in the controlling vessel is an inflatable and deflatable balloon attached to an outlet of the space between the panel sheets.

25. The panel according to claim 17 wherein the controlling vessel is container having dehydrating material.

26. The open roof construction according to claim 17, wherein the controlling vessel is elongated and extends in a transverse direction with respect to forward movement of the vehicle.

\* \* \* \* \*